United States Patent

Shimamura et al.

[15] 3,643,180

[45] Feb. 15, 1972

[54] DELTA MODULATOR APPARATUS

[72] Inventors: Tadao Shimamura; Yukio Takimoto, both of Tokyo, Japan

[73] Assignee: Nippon Electric Company, Limited, Tokyo, Japan

[22] Filed: Mar. 9, 1970

[21] Appl. No.: 17,506

[30] Foreign Application Priority Data

Mar. 11, 1969 Japan....................................44/18022

[52] U.S. Cl. ..............................332/11 D, 307/229, 307/237, 325/38 B, 328/119, 328/127, 328/171, 332/16

[51] Int. Cl. .........................................................H03k 13/22

[58] Field of Search.................328/119, 127, 171; 332/11 D, 332/16; 325/38.1; 307/229, 237, 231, 293

[56] References Cited

UNITED STATES PATENTS

| | | | |
|---|---|---|---|
| 2,621,292 | 12/1952 | White | 328/127 |
| 3,300,733 | 1/1967 | Price | 307/293 X |
| 3,390,341 | 6/1968 | Kline | 307/237 X |
| 3,470,387 | 9/1969 | Reeves et al. | 307/231 |

OTHER PUBLICATIONS

Picciano et al, "Electronic Integration System for Low Level Fast Signals"—IBM Tech. Disclosure Bulletin Vol. 4, No. 12, May 1962, pp. 105-106, 328-127

Hellworth et al "Push-pull Feedback Delta Modulator"—IBM Tech. Disclosure Bulletin, Vol. 11, No. 7, Dec. 1968, pp. 877-878, 332-11D

*Primary Examiner*—Alfred L. Brody
*Attorney*—Marn & Jangarathis

[57] ABSTRACT

Improved delta modulator apparatus comprising a differential input circuit, a decision circuit timed by a sampling pulse generator and a decoder circuit is provided according to the present invention. In accordance with the teachings of this invention, the decoder circuit includes first and second integrator circuits interconnected by a nonlinear impedance device or network. The nonlinear impedance device or network utilized exhibits one value of impedance when the magnitude of the voltage applied thereto resides below a predetermined value and at least another value of impedance when the magnitude of the voltage applied thereto exceeds such predetermined value so that the resulting delta modulator apparatus formed manifests a high signal-to-noise ratio for slowly varying, relatively flat portions of an input signal to be encoded while rapidly responding to sharply sloping portions of such input signal.

15 Claims, 8 Drawing Figures

*INVENTORS*
Tadao Shimamura
Yukio Takimoto
BY
*Marn & Jangarathis*
*ATTORNEYS*

Fig. 4.
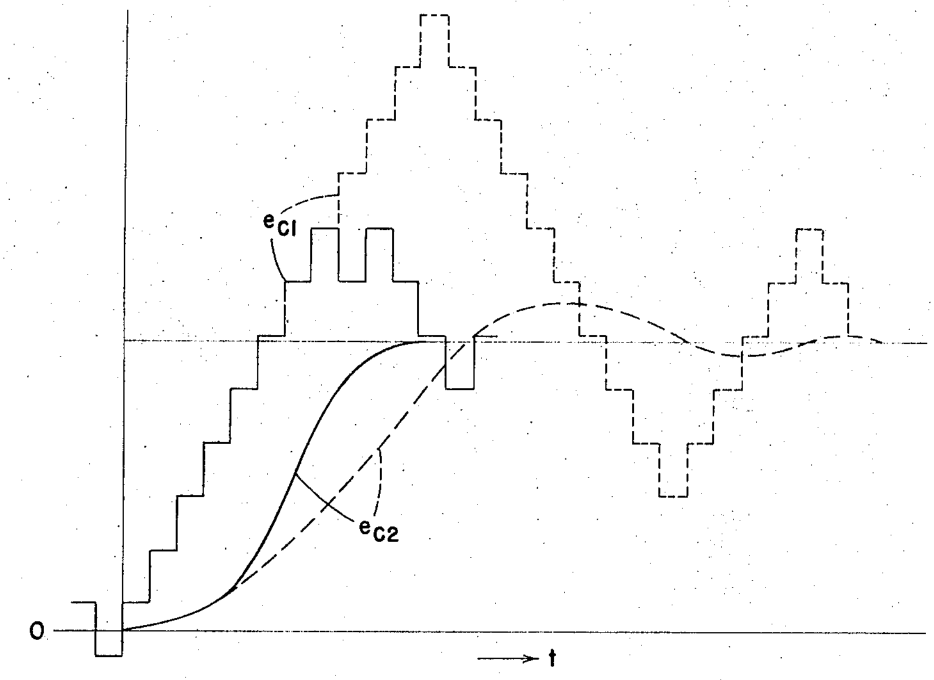
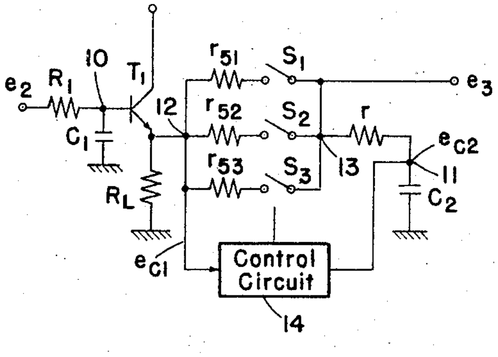
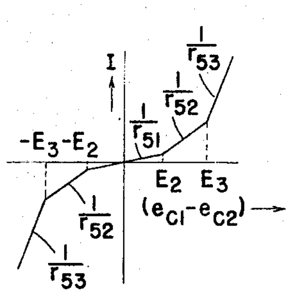
Fig. 5A. Fig. 5B.
INVENTORS
Tadao Shimamura
Yukio Takimoto
BY
Marn & Jangarathis
ATTORNEYS

DELTA MODULATOR APPARATUS

This invention relates to delta modulation communications systems and more particularly to delta modulator apparatus therefor.

Since the discovery of delta modulation techniques in the early 1950's, it has been evident that delta modulation communications systems possess a plurality of attractive attributes which render them highly advantageous when compared to other pulse communications systems presently in wide use. For instance, if a delta modulation communications system is compared to the well-known forms of pulse code modulation communications systems which are prevalent today, it will be seen that such delta modulation communications systems possess the marked structural advantage that the modulators and demodulators thereof are substantially simplified as compared to those present in conventional pulse code modulation communications systems. Furthermore, while a significant portion of the circuitry present in any pulse code modulation communications system must of necessity be devoted to establishing and maintaining the synchronization thereof, a delta pulse code modulation communications system does not require such synchronization and hence no complex circuitry dedicated thereto is required.

Delta modulator apparatus currently used in delta modulation communications systems generally takes the form of a differential input circuit means having one input thereof connected to a source of video or audio signals to be encoded, a second input thereof connected to an output of decoder means while the output thereof is connected to decision circuit means which may take the form of a coder circuit. The decision circuit means is timed by sampling pulse source means and the output of the decision circuit means acts as the output of the delta modulation apparatus while it is additionally applied to an input of said decoder means so that the decoded output of the decision circuit means is applied as an input to said differential circuit means whereby the coded output of the decision circuit means is utilized as a feedback signal to assure that the output of the delta modulator apparatus is properly representative of the input signals to be encoded. In such delta modulator apparatus, the decision circuit means may, in the simplest case, take the form of a conventional one-bit coder circuit which acts in the well-known manner to discriminate between positive and negative values of input signals applied thereto and produce in response to said input signals positive and negative output pulses, respectively, whose amplitudes are constant, at a rate determined by sampling pulses applied thereto.

The decoder circuit means relied upon in such conventional delta modulator apparatus generally takes the form of integrator means of either the single or double integration varieties which may include predicting capabilities. However, the exact nature of the decoder means relied upon is ultimately determined by the characteristics preferred by the designer of such conventional delta modulator apparatus because each form of decoder means presently available exhibits distinct advantages when present in conventional modulator apparatus as well as certain disadvantages which detract from the operation of the modulator apparatus formed as a whole. For instance, in modulator apparatus which includes decoder means taking the form of integrator means of the single integration variety, the integrator means will generally take the form of a simple R-C integrator. The single integration delta modulator apparatus thus formed exhibits a maximum tracing slope for an input signal to be encoded which is limited by the product of the magnitude of the quantizing step of the decision circuit means and the frequency of the sampling pulses applied thereto. Therefore, in such single integration delta modulator apparatus, the selection of a large magnitude quantizing step will enable the delta modulator apparatus to follow portions of the input signal characterized by a sharp slope; however, such single integration delta modulator apparatus will manifest substantial quantizing noise due to the size of the quantizing step produced by the decision circuit means. Conversely, if the decision circuit means relied upon in such single integration delta modulator means is designed to exhibit a low-magnitude quantizing step, the quantizing noise exhibited by the delta modulator apparatus is reduced but such single integration delta modulator apparatus is unable to appropriately follow sharply sloping portions of the input signal thereby causing slope overload noise to increase. Thus if single integration delta modulator apparatus of the foregoing kind receives an input signal measured at 1 volt peak-to-peak (1 Vpp) having a rise time of two-tenths of a microsecond (0.2 $\mu s$) to be encoded into a delta modulation pulse train with a sampling frequency of forty megahertz (40 $MH_z$); it will be appreciated that the magnitude of the quantizing step produced by the decision circuit means present therein will be required to be one hundred twenty-five millivolts (125 mV). When these conditions obtain in such single integration delta modulator apparatus, relatively flat portions of an input signal applied thereto for encoding will have quantizing noise of the order of one hundred twenty-five millivolts peak-to-peak (125 mVpp) associated therewith at the output of said single integration delta modulator apparatus. However, despite the substantial quantizing noise associated with the operation of single integration delta modulator apparatus, the use of decoder means of the single integration variety allows each succeeding portion of the signal to be predicted by the integrator circuit and hence the resulting delta modulator apparatus is advantageous because it exhibits relatively high-response speeds to the input signal to be encoded.

In contradistinction thereto, modulator apparatus which comprises decoder means taking the form of integrator means of the double integration variety includes a second integrator stage normally coupled to the output of the integrator stage described above in conjunction with decoder means of the single integration variety. Thus, integrator means of the double integration variety may comprise two simple R-C integrator circuits connected in a manner such that the output of the first integrator stage is applied as an input to the second integrator stage while the output produced by such double integrator means represents the difference between the individual output signals produced at each stage thereof. Additionally, integrator means of the double integration variety may include predicting means present in the second integrator stage thereof. The double integration delta modulator apparatus formed by relying upon a double integrator means for the decoder means exhibits a good signal to noise ratio for a slowly varying portion of an input signal to be encoded due to the difference signal produced by the double integrator means at the output of the decoder means; however, this type of delta modulator apparatus is slow to respond to rapidly changing portions of an input signal. Thus, under the exemplary conditions stated above for single integration delta modulator apparatus wherein the quantizing step produced by the decision circuit means is one hundred twenty-five millivolts (125 mV), double integration delta modulator apparatus operating under the same conditions exhibit substantially less quantizing noise at relatively flat portions of a video or audio input signal to be encoded; however, such double integration delta modulator apparatus cannot respond as rapidly to sharply sloped portions of an input signal to be encoded as the single integration delta modulator apparatus described above.

A possible solution to overcoming the disadvantages associated with encoding video signals with the conventional forms of single or double integration delta modulator apparatus set forth above has been proposed in the article entitled, "Pictorial Transmission With HIDM" as published in The IEEE International Convention Record, 1965, at pgs. 285–291. Briefly, the method relied upon in the publication involves the detection of slope information from an input signal by logic circuits which derive such information from coded pulses and thereafter act to vary the magnitude of the quantizing steps produced by the decision circuit means in response to such slope information. The transmission techniques utilized rely upon the visual characteristics of a television picture wherein at a rapidly changing portion of a television picture, i.e., from white to black or black to white, a signal to noise ratio which is lower than is usually acceptable does not substantially influence the quality of the image produced. Accordingly, in the cited publication, where the input video signal sharply varies at rapidly changing portions of the television picture, i.e., from white to black or black to white, the magnitude of the quantizing step produced is made large so that the delta modulator apparatus is rendered capable of responding thereto at times when the picture quality will not be impaired by a lowering of the signal-to-noise ratio. The delta modulator apparatus proposed in the cited article appears to exhibit good overall characteristics, however, as the techniques employed rely upon the characteristics of a television picture and hence are not of general application and the delta modulator apparatus proposed requires complex logic circuits capable of extracting the slope information of the input signal and several types of voltage generators capable of changing the magnitude of the quantizing steps produced; this form of delta modulator apparatus is not considered to provide an appropriate practical solution to the problems associated with encoding video and audio signals with conventional delta modulator apparatus.

Therefore it is an object of this invention to provide delta modulator apparatus employing decoder means exhibiting a relatively high signal-to-noise ratio at slowly varying portions of an input signal while being capable of rapidly responding to sharply sloping portions of an input signal.

A further object of this invention is to provide delta modulator apparatus exhibiting relatively good predicting characteristics such as those inherent in delta modulator apparatus employing double integration decoder means.

An additional object of this invention is to provide novel delta modulator apparatus exhibiting excellent transmission characteristics and capable of encoding video and audio input signals.

Another object of the present invention is to provide novel decoder means for delta modulator apparatus which decoder means employs integrator means exhibiting a nonlinear impedance characteristic.

A further object of the present invention is to provide decoder means whose impedance characteristic varies in relation to the input signals received thereby.

Various other objects and advantages of the present invention will become clear from the following detailed description of several exemplary embodiments thereof, and the novel features will be particularly pointed out in conjunction with the claims appended hereto.

In accordance with the teachings of the present invention delta modulator apparatus, including differential circuit means, decision circuit means, sampling pulse generator means and decoder means is provided wherein said differential circuit means is adapted to receive input signals to be encoded at one input thereto, output signals from said decoder means at a second input thereto and applies an output representative of the difference therebetween to an input of said decision circuit means; the decision circuit means receives sampling pulses from said sampling pulse generator means and acts to discriminate between positive and negative values in output signals from said differential circuit means and to produce in response thereto positive and negative output pulses at a rate determined by said sampling pulses; the output pulses produced by said decision circuit means are applied to an output of the delta modulator apparatus formed and to an input of said decoder means; said decoder means being improved according to the present invention so as to comprise first and second integrator means connected by nonlinear impedance means. The invention will be more clearly understood by reference to the following detailed description of an exemplary embodiment thereof in conjunction with the accompanying drawings in which:

Figure 1:
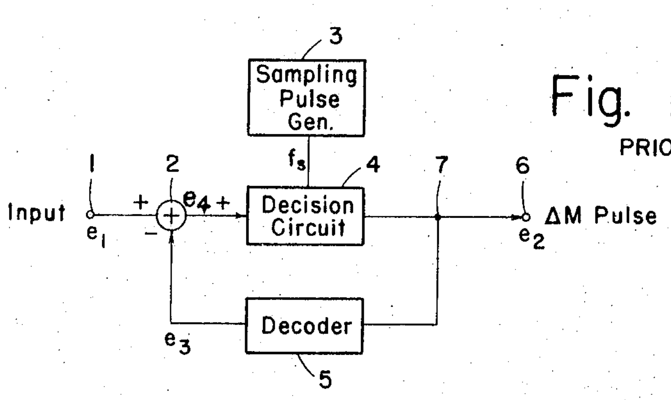
Fig. 1. PRIOR ART
FIG. 1 is a block diagram serving to schematically illustrate a generalized embodiment of delta modulator apparatus.
Figure 3A:
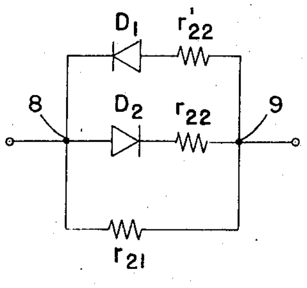
Figure 3B:
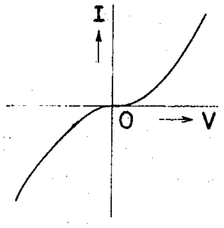
Figure 3C:
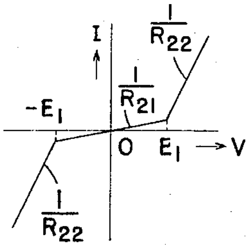

FIGS. 3A–3C illustrate one embodiment of nonlinear impedance means according to this invention together with the characteristics thereof wherein FIG. 3A shows one embodiment of nonlinear impedance means which may be relied upon in decoder means according to the teachings of the instant invention to form an embodiment of the delta modulator apparatus of the present invention while FIGS. 3B and 3C serve to graphically represent the characteristics of the embodiment of the nonlinear impedance means shown in FIG. 3A;

FIG. 4 graphically represents the step responses of conventional double integration delta modulator apparatus and those of an embodiment of the delta modulator apparatus according to the present invention; and FIGS. 5A and 5B illustrate another embodiment of the decoder means according to this invention together with the characteristics thereof wherein FIG. 5A shows such embodiment of the decoder means according to the present invention and may be utilized in the generalized embodiment of the delta modulator apparatus shown in FIG. 1 to illustrate another embodiment of the delta modulator apparatus of the present invention while FIG. 5B depicts the current versus applied voltage characteristic of the embodiment of the decoder means shown in FIG. 5A.

Referring now to the drawings and more particularly to FIG. 1 thereof, there is shown a block diagram which serves to schematically illustrate a generalized embodiment of delta modulator apparatus. The embodiment of the delta modulator apparatus shown in FIG. 1 comprises differential circuit means 2, sampling pulse generator means 3, decision circuit means 4 and decoder means 5. The differential circuit means 2 may take the form of a summing point, subtracting circuit means or any other form of conventional difference circuit which acts in the well-known manner to provide an output signal representative of the difference between first and second input signals applied thereto. A first input to the differential circuit means 2 is connected to input terminal means 1 which represents the input terminal to the illustrated delta modulator apparatus and receives, as shall be seen below, video or audio input signals to be encoded. A second input to the differential circuit means 2 is connected to the decoder means 5 at the output thereof and thus, the second input to the differential circuit means 2, as shall be seen below, receives an input signal representative of the decoded output signal of the illustrated delta modulator apparatus. Accordingly, as the first input of the differential circuit means 2 is connected to a source of input signals to be encoded and the second input thereto is adapted to receive signals representative of the decoded output signal of the illustrated delta modulator apparatus, it will be seen that the output produced by the differential circuit means 2 represents the error signal of the delta modulator apparatus shown in FIG. 1.

The output of the differential circuit means 2 is connected to an input of the decision circuit means 4. The decision circuit means 4 may take the form of a conventional one-bit coder circuit which acts in the well-known manner to discriminate between positive and negative values of input signals applied thereto and produce in response to said input signals positive and negative output pulses, respectively, whose amplitudes are constant, at a rate determined by sampling pulses applied to a timing input thereto. The timing input to the decision circuit means 4 is connected to the sampling pulse generator means 3 and the output of the decision circuit means 4 is connected to output terminal means 6 through junction point 7. The sampling pulse generator means 3 may take any conventional form of internal or external pulse generator apparatus having a suitable repetition rate while the output terminal means 6 should be understood as designating the output terminal of the illustrated delta modulator apparatus.

The output of the decision circuit means 4 is also connected at junction point 7 to an input of the decoder means 5 to thereby form a feedback loop from the output of the decision circuit means 4 to the second input of the differential circuit means 2 through the decoder means 5. The precise nature and structure which characterizes the decoder means 5 usable in the generalized delta modulator apparatus shown in FIG. 1, will be discussed in detail below in conjunction with FIGS. 2, 3A–3C, 5A and 5B; however, at this point in the description of the instant invention it is sufficient to appreciate that the decoder means 5 acts to decode the output of the decision circuit means 4 by way of integration to thereby produce at its output a signal representative of the decoded output of the illustrated delta modulator apparatus.

In the operation of the delta modulator apparatus depicted in FIG. 1, input signals $e_1$ representing video or audio signals to be encoded are applied to the input of terminal means 1 and sampling pulses having an appropriate repetition rate are applied to the timing input of the decision circuit means 4. The input signals $e_1$ applied to the input terminal means 1 are further applied to the first input of the differential circuit means 2 which also receives, at the second input thereto, the output $e_3$ from the decoder means 5. The input signals $e_1$ are differentially summed with the output $e_3$ from the decoder means 5 by the differential circuit means 2 and the output $e_4$ of the differential circuit means 2, representing an error signal equal to the difference between $e_1$ and $e_3$ is applied to the input of the decision circuit means 4. The decision circuit means 4 acts in the well-known manner upon the error signals $e_4$ received thereby to discriminate such error signals and produce in response thereto positive and negative output code pulses $e_2$ of constant amplitudes $\pm$ E at a rate determined by the repetition rate $f_s$ of the sampling pulses applied to the timing input thereof by the sampling pulse generator means 3. The output code pulses $e_2$ produced by the decision circuit means 4 are then applied to the output terminal means 6 of the illustrated delta modulator apparatus for transmission to a receiving point through a transmission medium (not shown) and through the junction point 7 to the input of the decoder means 5. The decoder means 5 may here be considered to merely integrate the output code pulses $e_2$ applied thereto from the junction point 7 and produce output signals $e_3$ therefrom representing the decoded output of the depicted delta modulator apparatus. The output code pulses $e_2$ produced by the decision circuit means 4 are thus applied to the input of the decoder means 5 wherein the same are integrated and fed back to the second input of the differential circuit means 2 so that an error signal $e_4$ may be derived. Therefore, it will be seen that the delta modulator apparatus depicted in FIG. 1 acts to minimize the absolute value of the error signal $e_4$ due to the feedback arrangement through the decoder means 5 so that the output signal $e_3$ produced by the decoder means 5 tends to approach the input signal $e_1$.

Figure 2:
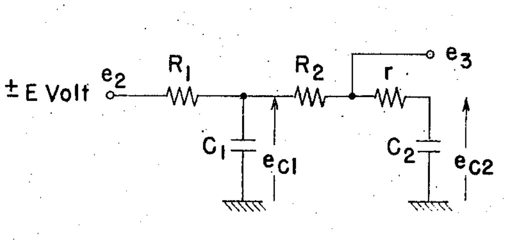
Fig. 2. PRIOR ART
FIG. 2 is a schematic diagram of conventional decoder means of the double integration variety which may be utilized in the generalized embodiment of the delta modulator apparatus shown in FIG. 1 to describe conventional double integration delta modulator apparatus.

A well-known form of double integration decoder means of a type conventionally inserted for the decoder means 5 generally indicated in FIG. 1 is illustrated in FIG. 2. As shown in FIG. 2, the conventional form of double integration decoder means comprises first and second integrator stages composed of simple R-C circuits $R_1C_1$ and $rC_2$, respectively, interconnected by resistor $R_2$. The input to the double integration decoder means shown in FIG. 2 is indicated at $e_2$ while the output thereof is indicated at $e_3$ in a manner to correspond to the input and output signal designations utilized for the generalized decoder means 5 shown in FIG. 1. If the first simple R-C integrator stage comprising resistor $R_1$ and capacitor $C_1$ of the decoder means is considered, it will be appreciated by those of ordinary skill in the art that if the values selected for the resistor $R_1$ and the capacitor $C_1$ are large so that the time constant defined by $R_1C_1$ becomes very large, the integrator stage formed thereby may be treated as an ideal integrator so that the current will be $E/R_1$ while the output voltage $e_{c1}$ will be proportional to the integral of this current, and hence to the integral of the applied voltage E. Therefore, the positive and negative output code pulses $e_2$, having magnitudes of +E or −E, applied to the input of the decoder means shown in FIG. 2 will cause the voltage $e_{c1}$ present on the capacitor $C_1$ to be incremented or decremented at a predetermined rate. If a series of positive pulses having a magnitude +E are considered as applied to the input of the decoder circuit shown in FIG. 2, it will be appreciated by those of ordinary skill in the art that with succeeding applications of an incrementing pulse at each sampling instant, the voltage $e_{c1}$ present on the capacitor $C_1$ will become increasingly larger. Therefore, if FIG. 4, which graphically represents the step responses of conventional double integration delta modulator apparatus and those of an embodiment of the delta modulator apparatus according to the present invention, is inspected, it will be seen that the manner in which the voltage $e_{c1}$ present on the capacitor $C_1$ of the first integrator stage is incremented and decremented is illustrated by the dashed curve referenced $e_{c1}$. As the voltage $e_{c1}$ present on the capacitor $C_1$ is increased, the value of the voltage $e_{c2}$ present on the capacitor $C_2$ of the second integrator stage will also begin to increase in the well-known manner due to the coupling of the second integrator stage to the output of the first integrator stage through resistor $R_2$ which is fixed in value. However, as the manner in which the voltage $e_{c2}$ is incremented is dependent on the voltage $e_{c1}$ present on the capacitor $C_1$ at a given instant and proportional to the difference between voltages $e_{c1}$ and $e_{c2}$, the step response wave pattern of the voltage $e_{c2}$ present on the capacitor $C_2$ will be substantially less sensitive to succeeding incrementing or decrementing pulses applied to the input $e_2$ than the step response wave pattern of the voltage $e_{c1}$ present on the capacitor $C_1$. The step response wave pattern of the voltage $e_{c2}$ on the capacitor $C_2$ is indicated by the dashed curve annotated $e_{c2}$ in FIG. 4 and a comparison of dashed curves $e_{c1}$ and $e_{c2}$ shown in FIG. 4 will readily reveal that the response wave pattern of voltage $e_{c2}$ is substantially less sensitive to succeeding incrementing or decrementing pulses than the corresponding response wave pattern plotted for the voltage $e_{c1}$. Accordingly, as the value of the output $e_3$ derived from the decoder means depicted in FIG. 2 is taken from a point intermediate the first and second integrator stages, the value of the output of the decoder means applied to the second input of the differential circuit means shown in FIG. 1 will be proportional to the difference between $e_{c1}$ and $e_{c2}$. Therefore, as the value of $e_{c2}$ is not highly responsive to succeeding incrementing pulses, conventional delta modulator apparatus relying upon double integrator decoder means such as that illustrated in FIG. 2, will be incapable of rapidly responding to sharply sloped portions of an input signal to be encoded even though such double integration decoder means display high signal to noise ratios for slowly varying, relatively flat portions of an input signal to be encoded.

The present invention proceeds upon the recognition that delta modulator apparatus having the excellent signal to noise characteristics of double integration delta modulator apparatus for slowly varying, relatively flat portions of an input signal to be encoded may be retained while such delta modulator apparatus exhibiting a relatively rapid response to sharply sloped portions of an input signal may be achieved by the utilization therein of decoder means including nonlinear impedance means which varies in response to the magnitude of the voltage applied thereto. More particularly, it has been determined that the advantageous signal to noise characteristics of the double integrator decoder means shown in FIG. 2 with slowly varying, relatively flat portions of an input signal may be retained while the slow response to succeeding voltage increments of such double integration decoder means and hence the inadequate response to sharply sloped portions of an input signal to be encoded by delta modulator apparatus formed therewith may be markedly improved by the substitution of nonlinear impedance means, whose value is proportional to the magnitude of the voltage applied thereto, for the fixed resistor $R_2$ shown in the circuit of FIG. 2. The nonlinear impedance means relied upon may comprise such well-known circuit means as diodes, thermistors, composite circuits which include resistors and selectively activated switches, Zener diodes, silicon controlled rectifiers and/or well-known equivalents thereof. The characteristics of the nonlinear impedance means relied upon in the practice of this invention are such that the resistance value exhibited thereby is markedly decreased as the voltage applied thereto exceeds one or more predetermined values. Several exemplary embodiments of the instant invention will be set forth below, it being realized that the specific nonlinear impedance means and decoder means described are set forth merely to illustrate the concepts involved and that such nonlinear impedance means or decoder means are to be employed in the generalized delta modulator apparatus depicted in FIG. 1 in the manner stated below.

An exemplary embodiment of nonlinear impedance means which may be relied upon in decoder means used in the delta modulator apparatus of the present invention is shown in FIG. 3A. The embodiment of the nonlinear impedance means depicted in FIG. 3A is adapted to be directly substituted for the fixed resistor $R_2$ of the double integration decoder means shown in FIG. 2. The decoder means depicted in FIG. 2, as thus modified, may be substituted for the generalized decoder means 5 shown in FIG. 1 to thereby arrive at one embodiment of the delta modulator apparatus according to the present invention. The nonlinear impedance means depicted in FIG. 3A comprises an impedance network having three parallel branches commonly connected between junction points 8 and 9. One of said impedance branches includes the single resistor means $r_{21}$ which may have a value similar to the fixed resistor $R_2$ relied upon in the conventional decoder means illustrated in FIG. 2. As shall be seen below, the impedance branch containing the single resistor means $r_{21}$ serves as a high-resistance path for input signals applied to the illustrated circuit whose voltage magnitudes reside below a predetermined level. The second and third impedance branches each comprise diode means $D_2$ or $D_1$ and resistor means $r_{22}$ or $r_{22}'$ to thereby form oppositely directed complementary impedance branches. The diode means $D_2$ and $D_1$ may be entirely conventional and the values selected for the resistor means $r_{22}$ and $r_{22}'$ are chosen so that the forward resistance values of the diodes $D_2$ and $D_1$ are the same while each of said second and third impedance branches exhibits a lower resistance value than $r_{21}$ for input signals applied thereto whose voltages exceed a predetermined magnitude. Thus, as will be apparent to those of ordinary skill in the art, when the nonlinear impedance means depicted in FIG. 3A is substituted for the fixed resistor $R_2$ in the double integration decoder means shown in FIG. 2 and the value of $e_{c1}$–$e_{c2}$ is below a predetermined value, the charging of capacitor $C_2$ will take place through the impedance branch containing the single resistor means $r_{21}$ while when the magnitude of $e_{c1}$–$e_{c2}$ exceeds a predetermined value the charging of capacitor $C_2$ will take place through either the second or third impedance branches depending on the polarity associated with $e_{c1}$–$e_{c2}$.

The actual voltage to current characteristic of the nonlinear impedance means depicted in FIG. 3A is graphically represented in FIG. 3B wherein voltage values are plotted along the abscissa and current values are plotted along the ordinate. As will be appreciated by an inspection of FIG. 3B, the nonlinear voltage to current characteristic of the nonlinear impedance means described in conjunction with FIG. 3A may be approximated by the three segment curve shown in FIG. 3C wherein each segment represents a conductance value. Therefore, referring now to the approximated voltage to current characteristic plotted in FIG. 3C, it will be seen that the nonlinear impedance means shown in FIG. 3A may be represented by an equivalent circuit comprising a battery $E_1$ and a large resistance having a value $R_{21}$ in series therewith for small voltages while for larger voltage values the equivalent circuit therefor will comprise a battery $E_1$ in series with a smaller resistance having a value $R_{22}$. Accordingly, when the nonlinear impedance means shown in FIG. 3A is substituted for the fixed resistor $R_2$ of the double integration decoder means shown in FIG. 2, and the thus modified decoder means is used in the generalized delta modulator apparatus described in conjunction with FIG. 1, a positive input signal applied to the input terminal means 1 in the delta modulator apparatus shown in FIG. 1 will cause the voltage $e_{c1}$ across the capacitor $C_1$ present in the first integrator stage of the now modified decoder means of FIG. 2 to increase in the previously described manner. As the incrementing code pulses continue to be applied to the decoder means by the decision circuit means 4, so long as the absolute value of the difference between the voltages $e_{c1}$–$e_{c2}$ across the capacitors $C_1$ and $C_2$ is small, the charging current applied to the capacitor $C_2$ may be represented by the expression, $$\frac{e_{c1}-e_{c2}}{R_{21}+r},$$

Thus under these conditions the incrementing or decrementing of the voltage $e_{c2}$ present on capacitor $C_2$ will take place in much the same manner as was explained for the conventional double integration decoder means previously described in conjunction with FIG. 2 and hence the modification of the decoder means of FIG. 2 by the substitution of the nonlinear impedance means shown in FIG. 3A for the fixed resistor $R_2$ does not substantially alter the characteristics of the delta modulator apparatus formed as far as slowly varying, relatively flat portions of an input signal are concerned. Therefore, the delta modulator apparatus according to this invention retains the excellent signal to noise characteristics normally associated with delta modulator apparatus relying on double integration decoder means for slowly varying, relatively flat portions of an input signal to be encoded.

However, when the absolute value of the difference in the voltages $e_{c1}$–$e_{c2}$ across the capacitors $C_1$ and $C_2$ in the modified decoder circuit exceeds the value of the magnitude of an incrementing code pulse $E_1$, the charging current applied to the capacitor $C_2$ is represented by the expression, $$\frac{e_{c1}-e_{c2}-E_1}{R_{22}+r}.$$

Therefore, as $R_{22}<<R_{21}$, as may be seen from the conductance curve for the nonlinear impedance means shown in FIG. 3C, the charging current applied to capacitor $C_2$ under these conditions will be much larger than was the case when the absolute value of the difference between the voltages $e_{c1}$ and $e_{c2}$ across capacitors $C_1$ and $C_2$ was small. Therefore, when these conditions obtain, the voltage $e_{c2}$ across capacitor $C_2$ will be incremented or decremented at an increased rate thereby allowing the demodulator apparatus formed to rapidly respond to sharply sloped portions of an input signal to be encoded. The step responses of the delta modulator apparatus formed in accordance with the teachings of the instant invention by the aforesaid substitution of the nonlinear impedance means shown in FIG. 3A for the fixed resistor $R_2$ in FIG. 2 are illustrated in FIG. 4 by the solid curves referenced $e_{c1}$ and $e_{c2}$. As may be appreciated from an inspection of FIG. 4, when the difference between the absolute values of $e_{c1}$ and $e_{c2}$ is small, the rate of increase of the voltage $e_{c2}$ on capacitor $C_2$ is substantially the same as obtained in conventional delta modulator apparatus relying upon the double integration decoder means shown in FIG. 2; however, when the difference between the absolute values of $e_{c1}$ and $e_{c2}$ exceeds a predetermined value the rate of increase of the voltage $e_{c2}$ across capacitor $C_2$ becomes nearly the same as the rate of increase of the voltage $e_{c1}$ across the capacitor $C_1$. Accordingly, it will be seen that the instant embodiment of the delta modulator apparatus according to the present invention achieves low signal-to-noise ratios for slowly varying, relatively flat portions of an input signal to be encoded while it exhibits rapid response times to sharply sloped portions of such input signal. Additionally, it should be noted that if the value selected for the portion of the conductance curve annotated $1/R_{21}$ in FIG. 3C is selected to be equal to the fixed resistor $R_2$ shown in FIG. 2, this embodiment of delta modulator apparatus will exhibit substantially the same signal-to-noise ratio as the conventional double integration decoder means shown in FIG. 2 for slowly varying, relatively flat portions of an input signal to be encoded, while being characterized by rapid response times for transient portions of said input signal.

Another embodiment of the present invention may be clearly understood from a consideration of FIGS. 5A and 5B which illustrate an embodiment of decoder means in accordance with the teachings of the present invention suitable for direct substitution into the generalized delta modulator apparatus shown in FIG. 1 and the current versus applied voltage characteristics for such decoder means, respectively. The embodiment of the decoder means shown in FIG. 5A is adapted for direct substitution for the generalized decoder means 5 shown in FIG. 1 and comprises first and second integrator stages interconnected by a variable impedance network. The first integrator stage is formed by the series connection of resistor $R_1$ and capacitor $C_1$ to form a simple R-C integrator circuit in much the same manner as described above in conjunction with FIG. 2. The input to the first integrator stage and hence the input to the decoder means depicted in FIG. 5A is indicated at $e_2$ so that the point of connection of this decoder into the generalized delta modulator apparatus shown in FIG. 1 is rendered apparent. The output of the first integrator stage is taken from junction point 10 which resides between the resistor $R_1$ and the capacitor $C_1$ in the usual manner. The second integrator stage also takes the form of a simple R-C circuit formed by the series connection of resistor $r$ and capacitor $C_2$ in much the same manner as described above. In the second integrator stage, a junction point 11 is provided intermediate the series connection of the resistor $r$ and the capacitor $C_2$ so that the resistor $r$ may be used for predicting the value of the voltage $e_2$ which will be present across the capacitor $C_2$ in the next sampling instant in the manner described in "Delta Modulation, A Method Of P.C.M. Transmission Using A One-Unit Code," de Jager, F., Philips Res. Rep., 7, 1952, pp. 442–446. The nonlinear impedance network interconnecting the first and second integrator stages comprises buffer transistor means $T_1$, a plurality of resistor means $r_{51}$–$r_{53}$, a plurality of switch means $S_1$–$S_3$ and control circuit means 14 for selectively actuating said plurality of switch means $S_1$–$S_3$. The buffer transistor means $T_1$, as shown in FIG. 5A takes the form of an NPN-transistor $T_1$ connected in a common-collector or emitter follower circuit configuration. The emitter electrode of the transistor $T_1$ is connected to the load resistance $R_L$ and to junction point 12 while the collector electrode thereof is connected to a source of positive biasing potential (not shown) and the base electrode is connected to the output of the first integrator stage at junction point 10. As thus formed, the buffer transistor means $T_1$ exhibits the relatively high-input impedance and less than unity gain normally associated with emitter-follower circuits and thus acts as an impedance-matching device for the output of the first integrator stage. Although an NPN-transistor has been illustrated in FIG. 5A, it will be appreciated by those of ordinary skill in the art that properly biased PNP-transistor devices could alternatively be used as well as any other form of impedance-matching means.

The plurality of resistor means $r_{51}$–$r_{53}$ are each connected in series with one of the plurality of switch means $S_1$–$S_3$ to thereby form three parallel impedance branches between the junction point 12 and the input to the second integrator stage indicated at junction point 13. The values of resistor means $r_{51}$–$r_{53}$ are selected in a manner such that the inequality $r_{51}> r_{52}>r$obtains and thus depending on which of the switch means $S_1$–$S_3$ is in a closed condition, one of three distinct impedance branches exhibiting widely varying resistance values is available for the application of the output of the first integrator stage to the input of the second integrator stage whereby the variable impedance network here depicted exhibits at least three distinct resistance values. The plurality of switch means $S_1$–$S_3$ shown in FIG. 5A have been illustrated as ordinary single-pole, single-throw, mechanical switches to render their function in the illustrated decoder means apparent; however, as will be apparent to those of ordinary skill in the art, electronic switches such as transistors or selectively enabled grating means as well as electrically actuated switch means are readily available for use as switch means $S_1$–$S_3$ and are ordinarily relied upon herein. The plurality of switch means $S_1$–$S_3$, as indicated in FIG. 5A, are adapted to be selectively actuated by the control circuit means 14. The control circuit means 14 may take the form of a differential amplifier and a threshold circuit or any other form of circuit means capable of detecting the difference in the voltages $e_{c1}$ and $e_{c2}$ present on the capacitors $C_1$ and $C_2$, respectively, and producing control signals in response thereto for selectively actuating the plurality of switch means $S_1$–$S_3$. The order of actuation of the plurality of switch means $S_1$–$S_3$ is such that when the absolute value of the difference between $e_{c1}$–$e_{c2}$ is below $E_2$, switch means $S_1$ is closed; when the absolute value of the difference between $e_{c1}$–$e_{c2}$ is above $E_2$ but below $E_3$, switch means $S_2$ is closed; and when the absolute value of the difference between $e_{c1}$–$e_{c2}$ is above $E_3$, switch $S_3$ is closed. The control circuit means 14 is connected between junction points 11 and 12 so that the absolute value of the difference between the voltage on capacitors $C_1$ and $C_2$ may be readily detected.

The current versus applied voltage characteristic for the nonlinear circuit means formed by the buffer transistor means $T_1$, the plurality of resistor means $r_{51}$–$r_{53}$ the plurality of switch means $S_1$–$S_3$ and the control circuit means 14 is plotted in FIG. 5B. As may be appreciated from an inspection of FIG. 5B, the plot of current versus applied voltage yields five linear segments representing conductance and hence the nonlinear impedance characteristic of the nonlinear impedance network present in FIG. 5A is similar to that discussed in conjunction with FIG. 3C but may be selectively varied in response to the difference between the voltages $e_{c1}$ and $e_{c2}$ to a much greater degree than was available with the nonlinear impedance means shown in FIG. 3A. Therefore it will be seen that when the decoder means illustrated in FIG. 5A is substituted for the generalized decoder means 5 in the delta modulator apparatus shown in FIG. 1, the resulting delta modulator apparatus formed will exhibit a high signal-to-noise ratio for slowly varying, relatively flat portions of an input signal to be encoded, a rapid response to sharply sloped portions of said input signal and appropriate response speeds coupled with good signal-to-noise ratios for portions of the input signals whose rate of variation resides therebetween. Furthermore, if the resistor means $r_{51}$–$r_{53}$ shown in FIG. 5A are selected to exhibit highly accurate values, the delta modulator apparatus formed with the decoder means illustrated in FIG. 5A will manifest extremely accurate operational characteristics.

As will be appreciated from the foregoing description of the present invention, the delta modulator apparatus set forth herein exhibits the high signal-to-noise ratios for slowly varying, relatively flat portions of an input signal to be encoded which are normally associated with double integration delta modulator apparatus while manifesting a rapid response to sharply sloped portions of an input signal which is not available in conventional double integration delta modulator apparatus. Further, the circuit structure utilized in the delta modulator apparatus according to the present invention is far simpler than in conventional adaptive delta modulator apparatus, such as the previously described HIDM system, and hence is less costly to manufacture, operate and maintain than such conventional adaptive delta modulator apparatus. Additionally, as will be obvious to those of ordinary skill in the art from the graphical representation set forth in FIG. 4, the dynamic range of the voltage output $e_{c1}$ of the first integrator stage of the delta modulator apparatus according to this invention may be made small so that this circuit may be operated using lower voltage power supplies than are ordinarily required to thereby achieve low-power consumption.

When delta modulator apparatus according to the present invention is utilized to encode audio input signals, such delta modulator apparatus is capable of responding instantaneously to the slope of said audio input signal, without regard to the magnitude thereof, while a high signal-to-noise ratio is maintained. Furthermore, because the delta modulator apparatus according to this invention will operate substantially as double integration delta modulator apparatus for low-level portions of an audio input signal to be encoded while for high-level portions of such audio signal it will operate at nonlinear portions of the decoder means impedance characteristic, the slope overload noise which normally attends the delta modulation coding of large magnitude signals will be substantially suppressed.

Although the present invention has been disclosed in conjunction with several specific embodiment thereof, various alternatives and modifications to the specific structure set forth herein will be obvious to those of ordinary skill in the art. For instance, if a thermistor exhibiting large thermal capacitance is used as the nonlinear impedance means contemplated by this invention and hence substituted for the resistor $R_2$ present in the decoder means shown in FIG. 2, a syllabic companding characteristic will be applied to an audio signal being encoded. Therefore, if the resistance value exhibited by the thermistor is changed with the syllabic rate, the thermistor will manifest a low-resistance value at high-magnitude portions of the audio signal being encoded to thereby lower slope overload noise while exhibiting a high-resistance value for low-magnitude portions of the audio signal to thereby reduce quantizing noise. Similarly, syllabic companding may be achieved in delta modulator apparatus according to this invention using the decoder means shown in FIG. 5A by designing the control circuit means 14 therein to have a time constant equal to the syllabic rate.

While the invention has been described in connection with several exemplary embodiments thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. In delta modulator apparatus adapted to receive an input signal to be encoded and produce in response thereto a coded pulse train output representative of the input signal received, said delta modulator apparatus including means for deriving an error signal equal to the difference between said input signal represented by said coded pulse train output and the actual input signal received, means for coding said error signal to thereby produce said coded pulse train and means for applying sampling pulses to said means for coding; wherein the improvement comprises:

decoder means electrically interposed between said means for coding said error signal and said means for deriving said error signal, said decoder means comprising first and second integrator means interconnected by nonlinear impedance means.

2. The improved delta modulator apparatus according to claim 1 wherein said nonlinear impedance means exhibits large resistance characteristics in response to low-voltage magnitudes applied thereto and low-resistance characteristics in response to large voltage magnitude applied thereto.

3. The improved delta modulator apparatus according to claim 2 wherein said nonlinear impedance means is connected between an output of said first integrator means and an input to said second integrator means, said nonlinear impedance means comprising:

first impedance branch means having a large value resistor means disposed therein;

second impedance branch means having first diode means and resistor means connected in series disposed therein; and third impedance branch means having second diode means and resistor means connected in series disposed therein, said second diode means being oppositely directed with respect to said first diode means, said second and third impedance branch means exhibiting substantially similar resistance for oppositely directed signals applied thereto and said first, second and third impedance branch means being connected in parallel between said output of said first integrator means and said input to said second integrator means.

4. The improved delta modulator apparatus according to claim 2 wherein said second integrator means comprises predictive resistance means and capacitor means.

5. The improved delta modulator apparatus according to claim 2 wherein said nonlinear impedance means is connected between an output of said first integrator means and an input to said second integrator means, said nonlinear impedance means comprising:

a plurality of impedance branches connected in parallel, each of said plurality of impedance branches exhibiting a different value of resistance to signals applied thereto; and means for selectively connecting each of said plurality of impedance branches in a closed-circuit configuration between said output of said first integrator means and an input to said second integrator means.

6. The improved delta modulator apparatus according to claim 5 wherein each of said plurality of impedance branches comprises resistance means connected in series with switch means and said means for selectively connecting each of said plurality of impedance branches comprises means for enabling predetermined ones of said switch means in response to detected voltage magnitudes.

7. The improved delta modulator apparatus according to claim 6 wherein said second integrator means comprises predictive resistance means and capacitor means.

8. The improved delta modulator apparatus according to claim 7 wherein said means for selectively connecting each of said plurality of impedance branches is connected between said output of said first integrator means and a point electrically intermediate said predictive resistance means and said capacitor means present in said second integrator means.

9. The improved delta modulator apparatus according to claim 8 wherein said nonlinear impedance means additionally comprises buffer circuit means interposed between said output of said first integrator means and said plurality of impedance branches connected in parallel.

10. Decoder means for use in delta modulator apparatus, said decoder means comprising first and second integrator means and nonlinear impedance means connected between an output of said first integrator means and an input to said second integrator means, said nonlinear impedance means comprising:

first impedance branch means having a large value resistor means disposed therein;

second impedance branch means having first diode means and resistor means connected in series disposed therein; and third impedance branch means having second diode means and resistor means connected in series disposed therein, said second diode means being oppositely directed with respect to said first diode means, said second and third impedance branch means exhibiting substantially similar resistance for oppositely directed signals applied thereto and said first, second and third impedance branch means being connected in parallel between said output of said first integrator means and said input to said second integrator means.

11. The decoder means according to claim 10 wherein said nonlinear impedance means is connected between an output of said first integrator means and an input to said second integrator means, said nonlinear impedance means comprising:

a plurality of impedance branches connected in parallel, each of said plurality of impedance branches exhibiting a different value of resistance to signals applied thereto; and means for selectively connecting each of said plurality of impedance branches in a closed-circuit configuration between said output of said first integrator means and an input to said second integrator means.

12. The improved delta modulator apparatus according to claim 11 wherein each of said plurality of impedance branches comprises resistance means connected in series with switch means and said means for selectively connecting each of said plurality of impedance branches comprises means for enabling predetermined ones of said switch means in response to detected voltage magnitudes.

13. The decoder means according to claim 12 wherein said second integrator means comprises predictive resistance means and capacitor means.

14. The improved delta modulator apparatus according to claim 13 wherein said means for selectively connecting each of said plurality of impedance branches is connected between said output of said first integrator means and a point electrically intermediate said predictive resistance means and said capacitor means present in said second integrator means.

15. The improved delta modulator apparatus according to claim 14 wherein said nonlinear impedance means additionally comprises buffer circuit means interposed between said output of said first integrator means and said plurality of impedance branches connected in parallel.

* * * * *